D. G. MARDEN.
Improvement in Horse-Powers.
No. 114,168. Patented April 25, 1871.
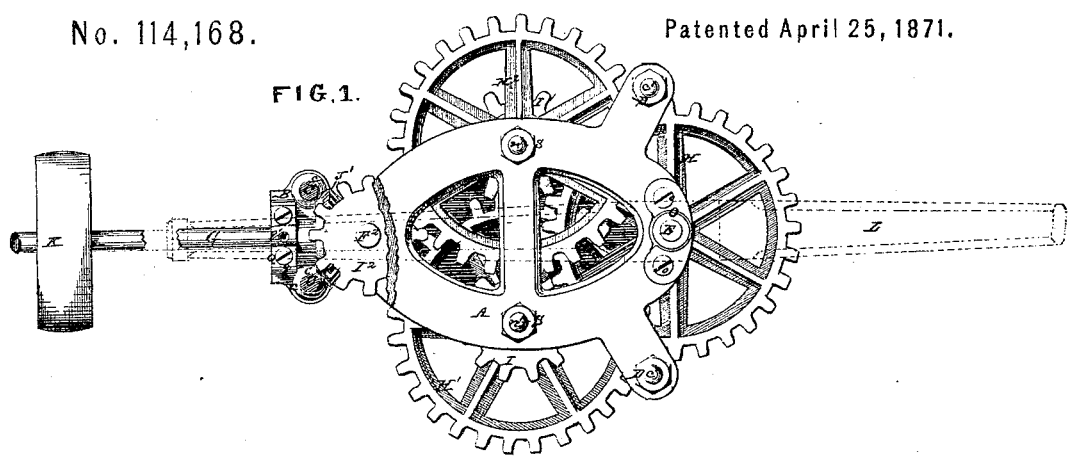
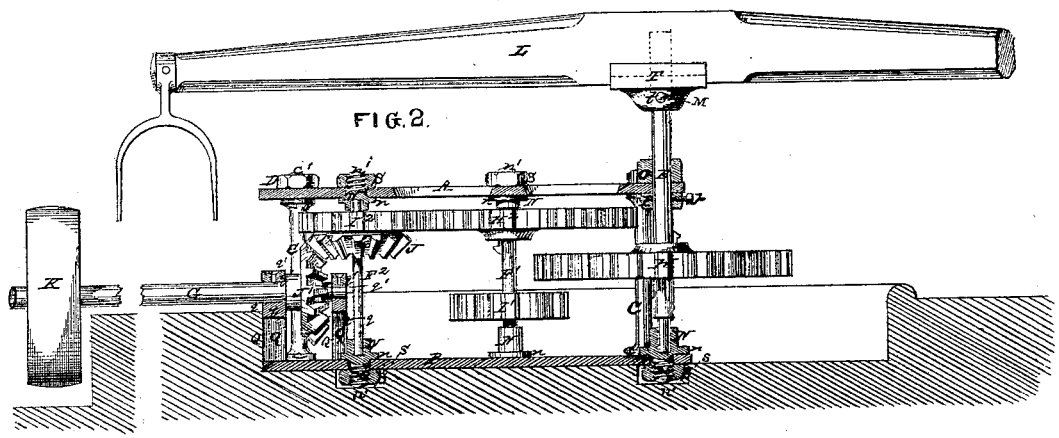
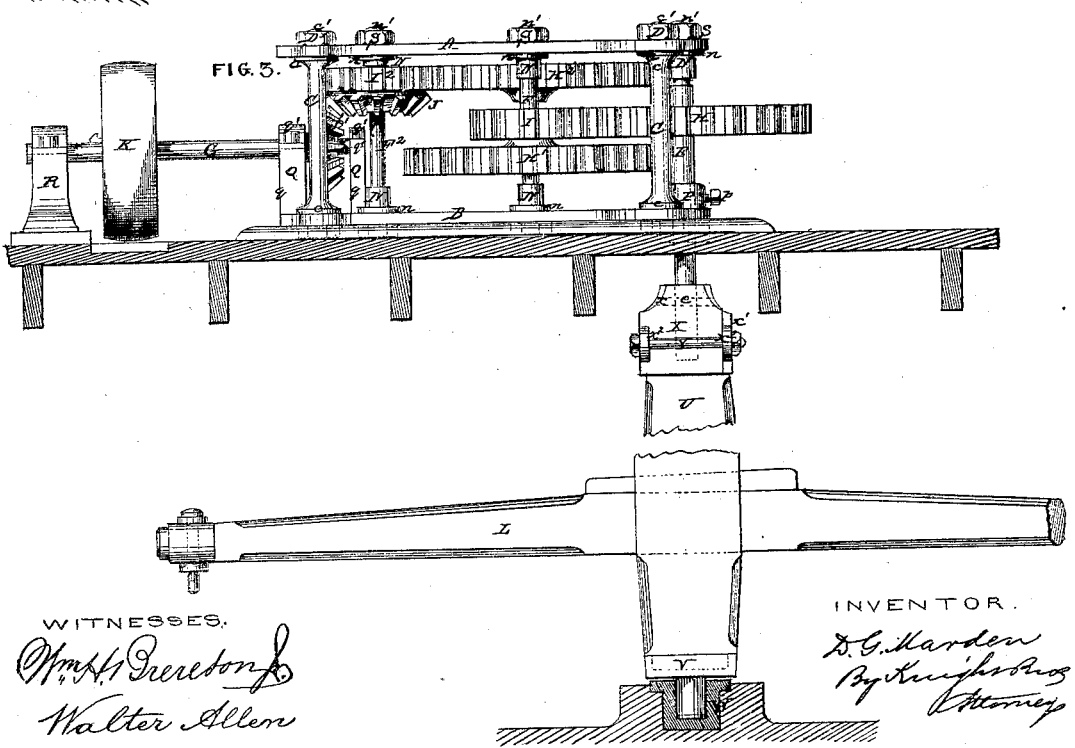

D. G. MARDEN.
Improvement in Horse-Powers.

Patented April 25, 1871.

WITNESSES

INVENTOR.

United States Patent Office.

DANIEL G. MARDEN, OF MEMPHIS, TENNESSEE.

Letters Patent No. 114,168, dated April 25, 1871.

IMPROVEMENT IN HORSE-POWERS.

The Schedule referred to in these Letters Patent and making part of the same.

I, DANIEL G. MARDEN, of Memphis, in the county of Shelby, Tennessee, have invented an Improved Horse-Power, of which the following is a specification.

Nature and Objects of the Invention.

The subject-matter of my invention is a spur-wheel horse-power adapted to work either on the ground or overhead, the horse or horses working over or under it, and in either an upright or an inverted position, as may be most convenient.

The improvements consist—

First, in "cup-boxes" of peculiar construction, to support both ends of each secondary vertical shaft.

Second, in a coupling-box for a shaft, for the attachment of the sweep when the power is overhead, by means of which said shaft may be removed without disturbing the power.

Description of the Accompanying Drawing.

Figure 1 is a plan view of my improved horse-power as arranged on the ground, the sweep being off, and its position indicated by dotted lines, and a portion of the framing broken away to expose internal parts.

Figure 2 is a central longitudinal section of the same.

Figure 3 is a side elevation of the apparatus as arranged on an elevated or upper floor, and adapted for the horses to work under it by an inversion of its driving-shaft only.

Like letters of reference indicate corresponding parts in the several figures.

Figure 4:
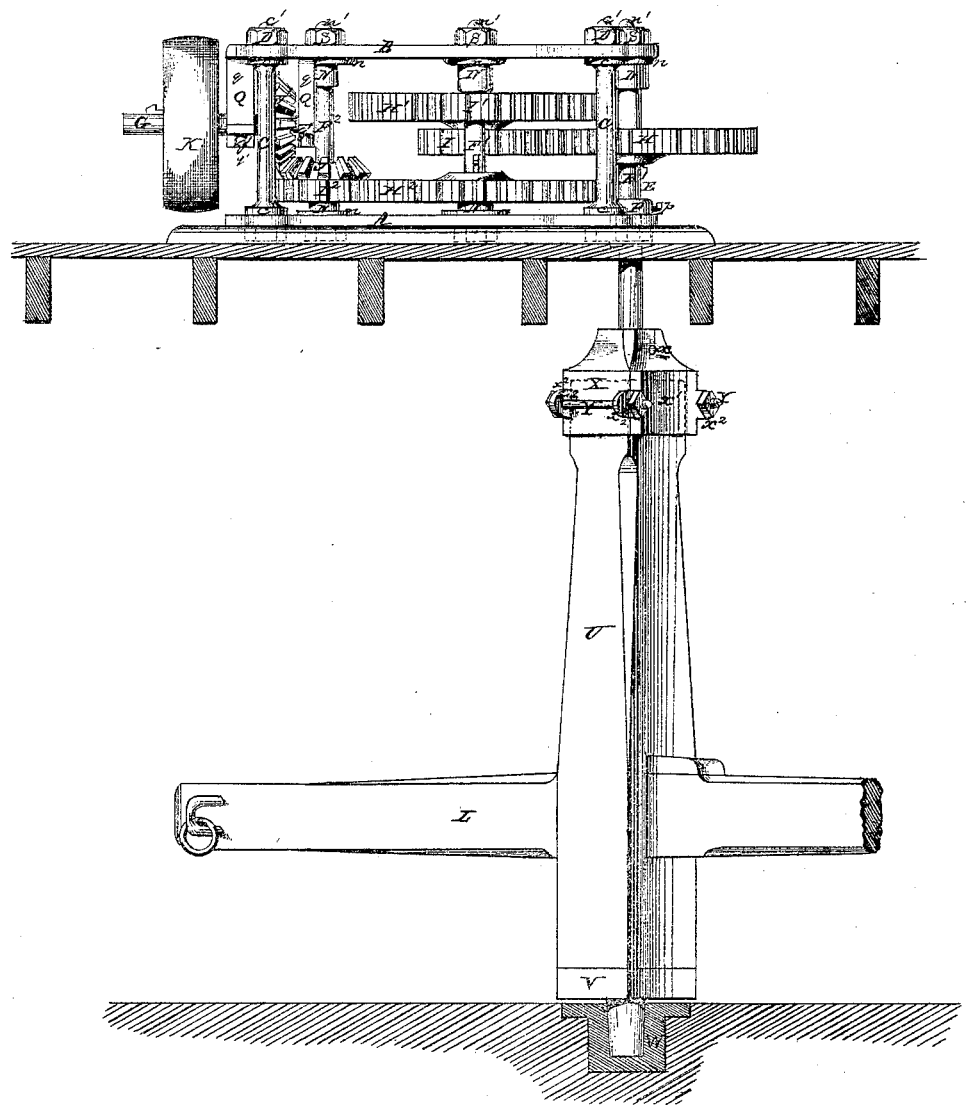
Figure 4 is a side elevation of the apparatus as working in an inverted position.

General Description.

My improved horse-power has a frame composed of two horizontal plates, A B, which may be cast from a common pattern, and four (more or less) pillars, C, which may also be uniform.

The said pillars are constructed with shoulders $c$ and screw-stems $c'$ at both ends, the latter passing through perforations in the plates, and provided with nuts D, by which the plates are clamped down on the said shoulders. They thus serve to support the plates at proper distance apart. The said plates support the gearing, being perforated to receive the bearings, or the attachments of the bearings, of the several shafts.

The gearing of the apparatus consists of a main vertical shaft, E, three (more or less) secondary vertical shafts, F F$^1$ F$^2$, and a horizontal or "parallel" shaft, G; the former connected by intermeshing spur-wheels H H$^1$ H$^2$ and pinions I I$^1$ I$^2$, so as to multiply motion, and the latter with the last secondary vertical shaft, F$^2$, by a pair of bevel-gears, J J'.

The motion is taken from a pulley, K, (or its equivalent,) on the last or parallel shaft G and imparted to the main or driving-shaft E through a sweep, L, to which the animal or animals are hitched in any manner.

For the attachment of the sweep L the said driving-shaft E is provided with a perforation or seat, $e$, for a transverse key, M, or any equivalent coupling.

The driving-shaft E is stepped at one end in a cup-box, N. Its other end projects through the opposite plate A, and is journaled in a box or sleeve, O, attached thereto by set-screws, and held by a removable collar, P, attached by a set-screw, $p$, or its equivalent.

The secondary vertical shafts F F$^1$ F$^2$ are each stepped at both ends in cup-boxes N.

The horizontal or parallel shaft G is supported at its inner end by two (or one or more) bearings, Q, and, if necessary, at its outer end, and at intermediate points, by additional bearings, R, of any approved construction.

The several gears are keyed or otherwise attached to or cast on the shafts.

The cup-boxes N are constructed with shoulders $n$ and screw-stems $n'$, and attached to the plates A B by nuts S applied to said stems. They are thus firmly attached, and may be readily removed.

The bearings Q may consist of brackets $q$ and caps $q'$, and may be attached to one or both of the plates A B by set-screws. They may be lubricated by any sufficient means.

It will be seen that the driving-shaft E, on its under collar O and gear H, being loosened, may be removed, and, with its bearings, reversed from the position represented in figs. 1 and 2 without disturbing the remainder of the apparatus. The apparatus thus adjusted is shown in fig. 3. This may be convenient in some cases, where as much space as can be obtained is at some times needed on the ground, and at others on the floor above.

The preferred adjustment of the apparatus for working overhead is shown in fig. 4. The same is here represented as simply inverted. The cup-box bearings N, for the several secondary vertical shafts F F$^1$ F$^2$, adapt the same to work in this position equally as well as in the other.

When the apparatus is placed on the ground or the same floor as the draft, the sweep L is attached directly to the driving-shaft E by the aid of a box, T, attached to its under side by screws or bolts, and provided with a continuation, $t$, of the key-seat $e$ (or its equivalent) of the same.

When the power is to be overhead a vertical shaft, U, is required for the attachment of the sweep.

The lower end of this shaft has the usual metal tip or trunnion V, and is stepped in a cup-box, W, the upper surface of which may be flush with the ground or floor. Its upper end I provide with a coupling-box, X, having a key-seat, $x$, (or its equivalent,) corresponding with T, and constructed, further, with a removable side, $x^1$, which may be secured by bolts Y, passing through perforated lugs $x^2$. The shaft is thus rendered laterally removable, and may consequently be taken down when the apparatus is not required, or to renew or inspect its cup-box W, without disturbing the apparatus, which is a great desideratum.

Claims.

I claim as my invention—

1. The cup-boxes N, constructed with shoulders $n$ and with screw-shanks $n'$, for the reception of nuts S, as described and shown, for the purposes set forth.

2. The improved spur-wheel horse-power herein described, having both ends of each secondary vertical shaft stepped in cup-boxes N and thus rendered reversible, as set forth.

3. The coupling-box X of the vertical sweep-shaft U, constructed with a removable side, $x'$, as and for the purpose set forth.

DANIEL G. MARDEN.

Witnesses:
J. W. HEATH,
M. B. TREZEVANT.